(12) United States Patent
Ivanov et al.

(10) Patent No.: US 7,899,465 B1
(45) Date of Patent: Mar. 1, 2011

(54) METHOD AND SYSTEM OF CALL ROUTING DEPENDING ON CALLER LOCATION IN MOBILE IP NETWORK

(75) Inventors: Nedko Ivanov, Budapest (HU); Simo Veikkolainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/148,775

(22) PCT Filed: Dec. 7, 1999

(86) PCT No.: PCT/EP99/09593

§ 371 (c)(1),
(2), (4) Date: Aug. 29, 2002

(87) PCT Pub. No.: WO01/43395

PCT Pub. Date: Jun. 14, 2001

(51) Int. Cl.
*H04W 24/00* (2009.01)

(52) U.S. Cl. .................. 455/456.1; 455/414.1; 455/428; 370/392.52

(58) Field of Classification Search .......... 455/428, 455/432.3, 445, 456.1, 456, 403, 414.1, 418, 455/422.1, 424, 404.1–2; 370/395.52, 351–360
See application file for complete search history.

(56) References Cited

U.S. PATENT DOCUMENTS

| | | | | |
|---|---|---|---|---|
| 5,440,541 A | * | 8/1995 | Iida et al. ..................... 370/352 |
| 5,479,482 A | * | 12/1995 | Grimes ..................... 455/556.1 |
| 5,946,618 A | * | 8/1999 | Agre et al. ..................... 455/428 |
| 5,963,861 A | * | 10/1999 | Hanson ..................... 455/456.1 |
| 5,999,536 A | * | 12/1999 | Kawafuji et al. ............. 370/401 |
| 6,067,529 A | * | 5/2000 | Ray et al. ..................... 705/26 |
| 6,075,783 A | * | 6/2000 | Voit ............................ 370/352 |
| 6,115,600 A | * | 9/2000 | Tuohino et al. ............. 455/405 |
| 6,272,129 B1 | * | 8/2001 | Dynarski et al. ............ 370/356 |
| 6,304,753 B1 | * | 10/2001 | Hartmaier ................... 455/413 |
| 6,311,055 B1 | * | 10/2001 | Boltz ....................... 455/414.1 |
| 6,330,453 B1 | * | 12/2001 | Suzuki et al. ............... 455/457 |
| 6,356,761 B1 | * | 3/2002 | Huttunen et al. ......... 455/456.1 |
| 6,374,108 B1 | * | 4/2002 | Jakobsen et al. ......... 455/432.1 |
| 6,377,810 B1 | * | 4/2002 | Geiger et al. ............ 455/456.2 |

(Continued)

FOREIGN PATENT DOCUMENTS

EP      0 800 320 A2      10/1997

(Continued)

OTHER PUBLICATIONS

Office Action issued by the Chinese Patent Office on Nov. 6, 2009 for Chinese Patent Application No. 200610107458.2.

*Primary Examiner*—CongVan Tran
(74) *Attorney, Agent, or Firm*—Cohen Pontani Lieberman & Pavane LLP

(57) ABSTRACT

The present invention discloses a system and a method for performing routing using location information of an IP terminal in a mobile IP telephony network. When a call is originated from an IP terminal to another subscriber it is checked whether location information of the IP terminal is required for the call. In case location information is required, the location information is added to the call setup data. Then, a destination address is determined on the basis of the call setup data and the location information. Finally, the call is routed to the determined destination address.

20 Claims, 5 Drawing Sheets

U.S. PATENT DOCUMENTS

| | | | |
|---|---|---|---|
| 6,466,571 B1 * | 10/2002 | Dynarski et al. | 370/352 |
| 6,549,625 B1 * | 4/2003 | Rautila et al. | 380/258 |
| 6,584,098 B1 * | 6/2003 | Dutnall | 370/354 |
| 6,591,306 B1 * | 7/2003 | Redlich | 709/245 |
| 6,600,735 B1 * | 7/2003 | Iwama et al. | 370/352 |
| 6,611,516 B1 * | 8/2003 | Pirkola et al. | 370/352 |
| 6,650,902 B1 * | 11/2003 | Richton | 455/456.3 |
| 6,677,894 B2 * | 1/2004 | Sheynblat et al. | 342/357.1 |
| 6,693,894 B1 * | 2/2004 | Andersson et al. | 370/352 |
| 6,717,937 B1 * | 4/2004 | Kao | 370/352 |
| 6,728,215 B1 * | 4/2004 | Alperovich et al. | 370/252 |
| 6,731,621 B1 * | 5/2004 | Mizutani et al. | 370/338 |
| 6,765,920 B1 * | 7/2004 | Tari et al. | 370/401 |
| 6,876,634 B1 * | 4/2005 | Lim | 370/310.1 |

FOREIGN PATENT DOCUMENTS

| | | |
|---|---|---|
| EP | 0 817 444 A2 | 1/1998 |
| JP | 10051859 | 2/1998 |
| JP | 10126445 | 5/1998 |

* cited by examiner

METHOD AND SYSTEM OF CALL ROUTING DEPENDING ON CALLER LOCATION IN MOBILE IP NETWORK

PRIORITY CLAIM

This is a U.S. national stage of PCT application No. PCT/EP99/09593, filed on Dec. 7, 1999. Priority is claimed on that application.

FIELD OF THE INVENTION

The present invention relates to the usage of subscriber location information in a mobile Internet protocol (IP) telephony network. In particular, the present invention relates to a method and a system for performing routing using location information of an IP terminal in a mobile IP telephony network.

BACKGROUND OF THE INVENTION

In conventional mobile circuit switched networks like GSM (Global System for Mobile communications) the location information of a mobile station is indicated to the network by a BSS (Base Station System). In a mobile IP telephony network, the mobile IP related services may be totally transparent to the underlying access network like GPRS (General Packet Radio Service) so that the access network has no means to provide any location information to the mobile IP telephony core network. Therefore, whenever there is a need for a mobile subscriber's location information in an IP telephony network, the location information (e.g. Cell ID) is not necessarily shown to the application that could have some use for it.

SUMMARY OF THE INVENTION

Therefore, it is an object of the present invention to improve application functionality in a mobile IP telephony network.

According to one aspect of the present invention, this object is achieved by a system for performing routing using location information of an IP terminal in a mobile IP telephony network. This system comprises an IP terminal as a subscriber of the mobile IP telephony network and a control unit as shown in FIG. 1. FIG. 1 is a schematic block diagram showing components of a mobile IP telephony network. The control unit receives a call that is originated in the IP terminal to another subscriber. When a call is originated from the IP terminal, the IP terminal checks whether location information of the IP terminal is required for this call and adds the location information to call setup data when required. Then, when the control unit receives the call it determines the address of the called subscriber or the destination address on the basis of the call setup data and the location information and routes the call to the determined destination address.

A call control application in the IP terminal obtains the location information of the IP terminal by communicating with a mobile terminal MT connected thereto. The call control application in the IP terminal may request the location information like a Cell ID from the mobile terminal.

The call originated from the IP terminal may be directed to a special service number which requires the location information of the IP terminal. In this case, the control unit maps the special service number or alias to a subscriber or destination address on the basis of the location information.

According to another aspect of the present invention, the above-mentioned object is achieved by a method for performing routing using location information of an IP terminal in a mobile IP telephony network.

FIG. 2 shows a flowchart of the basic steps of the method according to the present invention.

In a first step, a call is originated from an IP terminal of the mobile IP telephony network to another subscriber. In the next step, it is checked whether location information of the IP terminal is required for this call. When location information is required, the step of adding location information to call setup data follows. Then a subscriber or destination address is determined on the basis of the call setup data and the location information. If no location information is required, no location information is added to the call setup data and the subscriber address is determined on the basis of the call setup data alone. After the destination address has been determined, the call is routed to the determined destination address.

The location information may be provided by a communication between a call control application in the IP terminal and a dedicated mobile terminal MT.

According to a further aspect of the present invention, the object is achieved by an IP terminal in a system for performing routing using location information of the IP terminal in a mobile IP telephony network. The IP terminal is adapted to originate a call to another subscriber, wherein the IP terminal checks whether location information of the IP terminal is required for the call and adds location information to call setup data when required.

Moreover, according to a still further aspect of the present invention, the object is achieved by a control unit in a system for performing routing using location information of an IP terminal in a mobile IP telephony network. The control unit receives a call originated from an IP terminal to another subscriber together with call setup data comprising location information of the IP terminal. Then, the control unit determines a subscriber or destination address on the basis of the call setup data and the location information and routes the call to the determined destination address.

With the present invention, the application functionality in a mobile IP telephony network can be improved.

According to the present invention, subscriber location information can be obtained on request or automatically from a mobile terminal associated with the subscriber like an IP terminal. The location information can be used for a location based routing to a special subscriber or number.

In the following the present invention will be described by way of preferred embodiments thereof with reference to the accompanying drawings.

DESCRIPTION OF THE PREFERRED EMBODIMENTS

In the following, a first embodiment of the present invention will be described with reference to FIGS. 3 and 4. The first embodiment concerns location based routing to a special service number.

Figure 1:
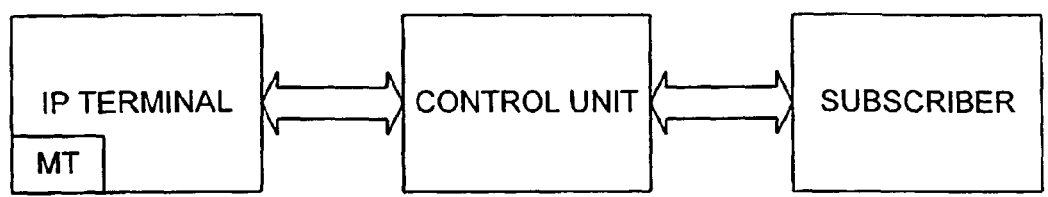
FIG. 1 shows a schematic block diagram of basic components in a mobile IP telephony network.
Figure 2:
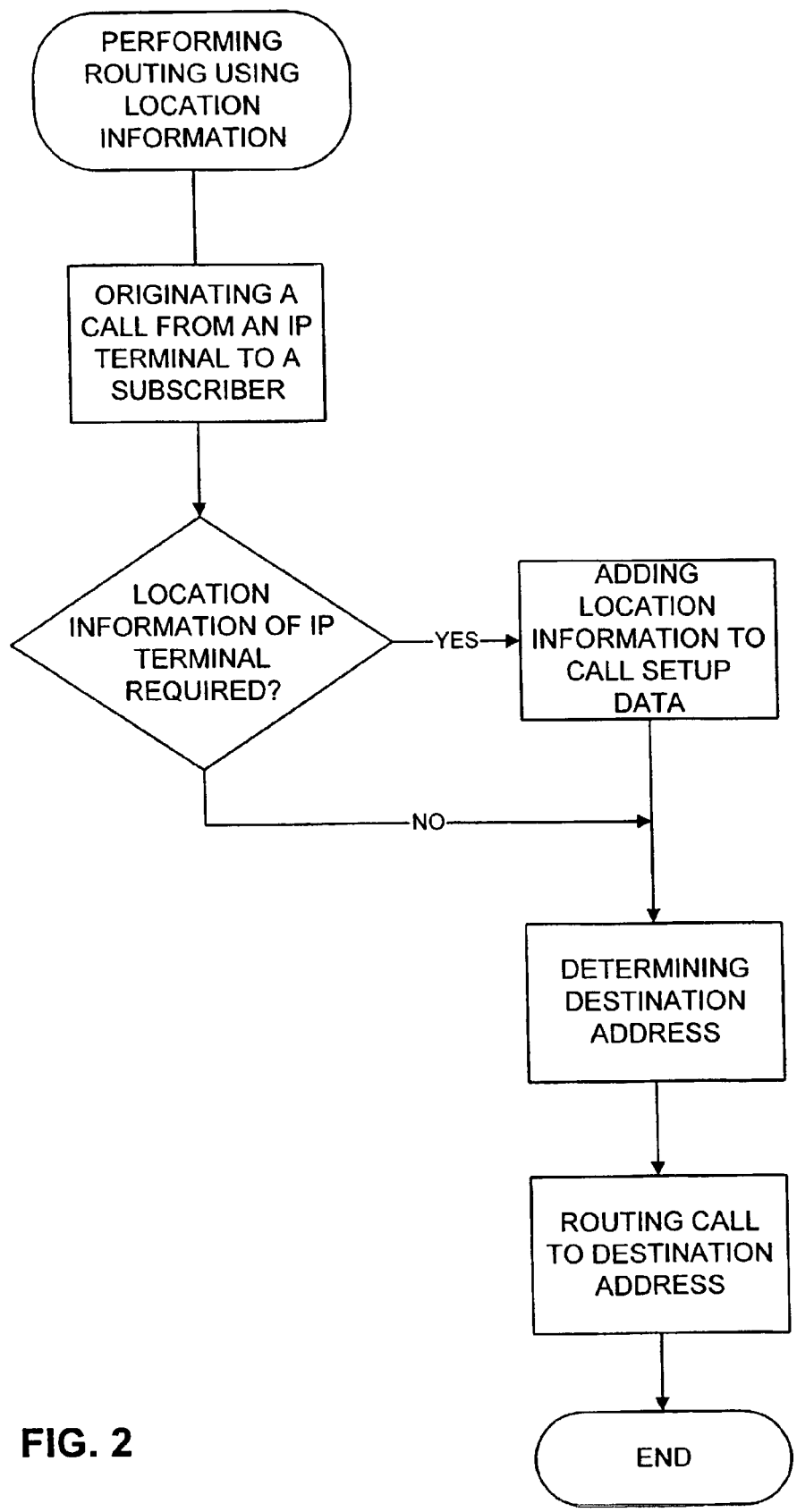
FIG. 2 shows a flowchart of the basic steps of the method according to the present invention.
Figure 3:
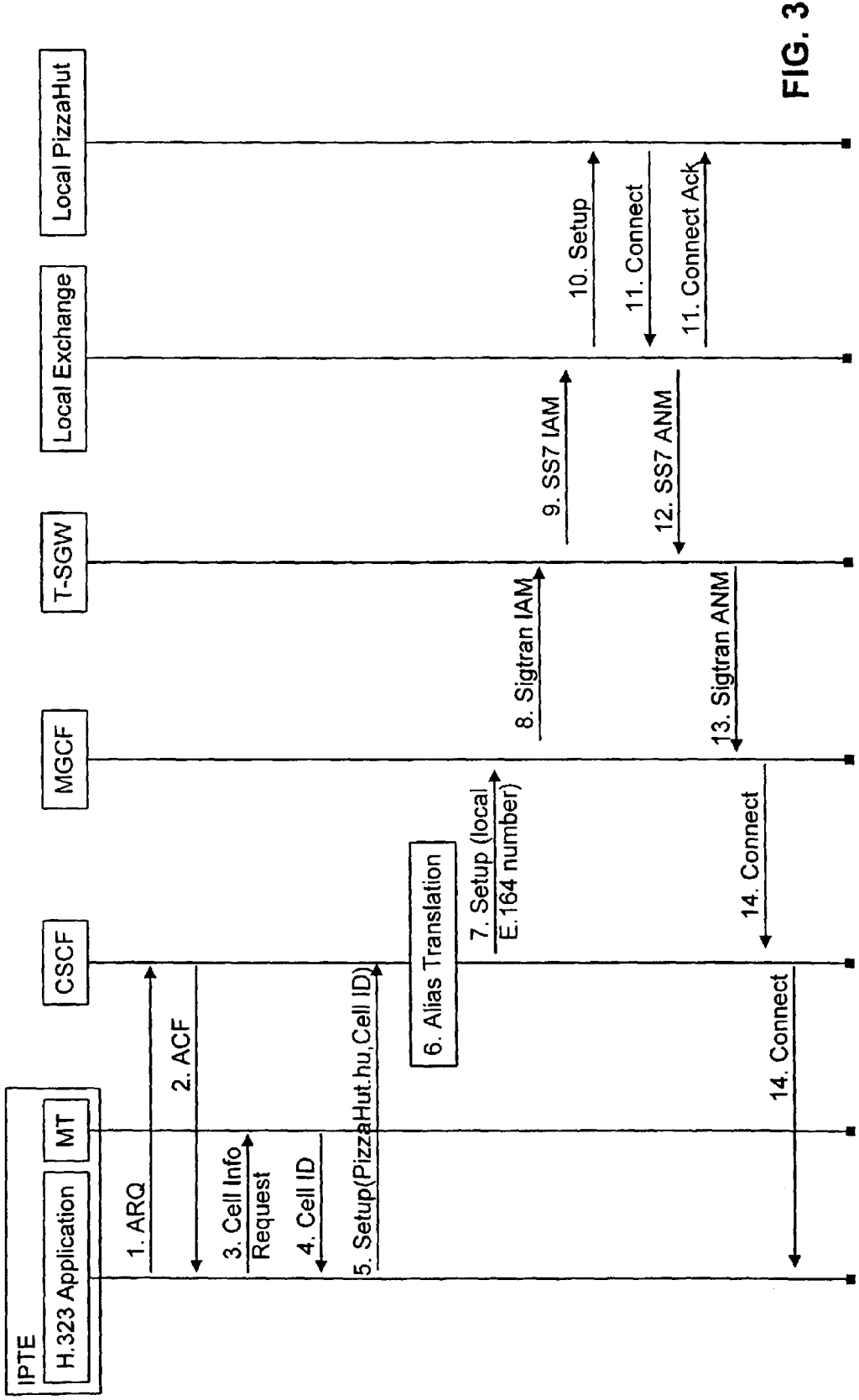
FIG. 3 shows a signaling diagram illustrating a setup procedure between an IP terminal and a subscriber in location dependent routing according to a first embodiment of the present invention.

FIG. 3 shows a setup procedure in location dependent routing to a special service number using H.323 environment. According to the first embodiment of the present invention, location information of a subscriber is provided to a mobile IP telephony core network in the following way. In FIG. 3, the IP terminal IPTE requests admission from a call state control function (CSCF) using a normal H.323 procedure. To be precise, in a message I, the subscriber IPTE sends an admission request (ARQ) with the requested bandwidth to the CSCF where the IPTE is currently registered. In a message 2, if the CSCF can accept the call it returns an admission confirm (ACF) with its own H.225.0 call signaling transport address (TA) since CSCF routed call model will be used.

The application knows that it has to get the location information of the IPTE for this call. The location information is obtained from a mobile terminal MT through an interface between the mobile aware H.323 application and the MT. Hence, in a message 3, the H.323 application inquires the MT for the current Cell ID indicating the location of the IPTE. Thereupon, in a message 4, the MT returns the Cell ID.

The location information is passed to the CSCF as part of the Setup message 5. In the message 5, the subscriber IPTE sends the Setup message to the CSCF with the special alias as destinationAddress and the Cell ID in the nonStandardData field (or in a dedicated field) in the user to user information element (UUIE) of the Setup message. Now, the CSCF has the necessary information (the alias like PizzaHut.hu and the Cell ID) in order to do the alias translation to an E.164 or alias of the nearest office or subscriber to the area where the subscriber IPTE is located. In other words, in step 6 in FIG. 3, the CSCF performs a mapping from the special service number or alias to an E.164 number or alias based on the location of the IP terminal. This is done by using a database incorporated into the CSCF, or, optionally, by forwarding the request to a database of another network.

In a message 7, the CSCF sends the Setup message with the new E.164 number as called party number to a Media Gateway Control Function (MGCF). Thereupon, the MGCF converts the H.323 Setup message to an Initial Address Message (IAM) carried over Sigtran and, in a message 8, sends the IAM to a Transport Signaling Gateway (T-SGW), the IAM including the new E.164 number. The T-SGW converts the Sigtran IAM to an SS7 IAM and sends it to a local exchange according to message 9. In a message 10, the local exchange initiates a call setup towards a local PizzaHut office.

When the called subscriber (the local PizzaHut office) answers the call, it sends a Connect message (message 11) to the local exchange and the local exchange acknowledges with a Connect Acknowledge (message 11). In a message 12, the local exchange sends an SS7 Answer Message (ANM) corresponding to the Connect message to the T-SGW. The T-SGW converts the SS7 ANM to a Sigtran ANM and sends it to the MGCF in a message 13. Finally, in a message 14, the MGCF sends a Connect message corresponding to the Sigtran ANM to the IPTE via the CSCF. At this point, both ways communication is possible between the subscriber IPTE and the called subscriber, i.e. the local PizzaHut office.

After the conversation is over and one of the parties hangs up (in this case the local PizzaHut office), a Disconnect message 15 (FIG. 4) is sent from the local PizzaHut office to the local exchange. Thereupon, a user network interface (UNI) channel between the local PizzaHut office and the local exchange is released according to message 16. Furthermore, in a message 17, a network to network interface (NNI) channel between the local exchange and the T-SGW is released. Thereafter, the resources between the T-SGW and the MGCF are released in a message 18. Finally, in a message 19, the resources between the MGCF, the CSCF and the IPTE are released.

In the following, a second embodiment of the present invention will be described with reference to FIG. 5. The second embodiment relates to an emergency call originated in the IP terminal IPTE.

In an emergency call case, the first message is an implicit request for the mobile terminal MT to provide the location information to the application. In other words, when a user of an IP terminal IPTE in a mobile IP telephony network initiates an emergency call by pressing for example an EC button on his H.323 application, the application itself first notifies the MT and requests an EC Packet Data Protocol (PDP) context establishment in a message 1, GPRS access being assumed.

In a message 2, the MT sends an activate EC PDP context request to an enhanced serving GPRS support node (E-SGSN) in order to create an access to the mobile IP telephony network. It is to be noted that the EC PDP context has to use a high priority and guaranteed bandwidth quality of service (QoS). The E-SGSN sends a create EC PDP context request to an enhanced gateway GPRS support node (E-GGSN) identified by an access point name (APN) pointing to the mobile IP telephony network in a message 3. After the E-GGSN has created the EC PDP context, in a message 4 it sends a response to the E-SGSN.

In a message 5, the E-SGSN indicates acceptance of the request from the MT for the EC PDP context activation. After the EC PDP context has been established, the MT sends the Cell ID to the H.323 application in a message 6 in order to put it in the nonStandardData field (or in a dedicated field) in the user to user information element (UUIE) of the Emergency Setup message.

Now that the IPTE has a high priority access to the mobile IP telephony network, it has to discover a CSCF which can serve its request. To be precise, due to the fact that the application may not know of any available CSCFs in the network, it has to perform a gatekeeper discovery procedure using H.323. Therefore, in a message 7, the IPTE sends a Gatekeeper Request (GRQ) message with an indication in the nonStandardData field (or in a dedicated field) that it requires the H.225.0 call signalling TA in a Gatekeeper Confirm(GCF) message.

All the CSCFs which can serve the IPTE have to reply with a GCF message including their H.225.0 call signalling TA in the nonStandardData field (or in a dedicated field) of the GCF message in a message 8. Since this is an emergency call, registration (registration request (RRQ), registration confirm (RCF)) and admission (ARQ, ACF) are not required. The IPTE also knows the H.225.0 call signalling TA from the GCF message so it can start sending a call control signaling. In a message 9, the IPTE sends an Emergency Setup message to the CSCF with the Cell ID in the nonStandardData field (or in a dedicated field) as part of the UUIE.

Figure 5:
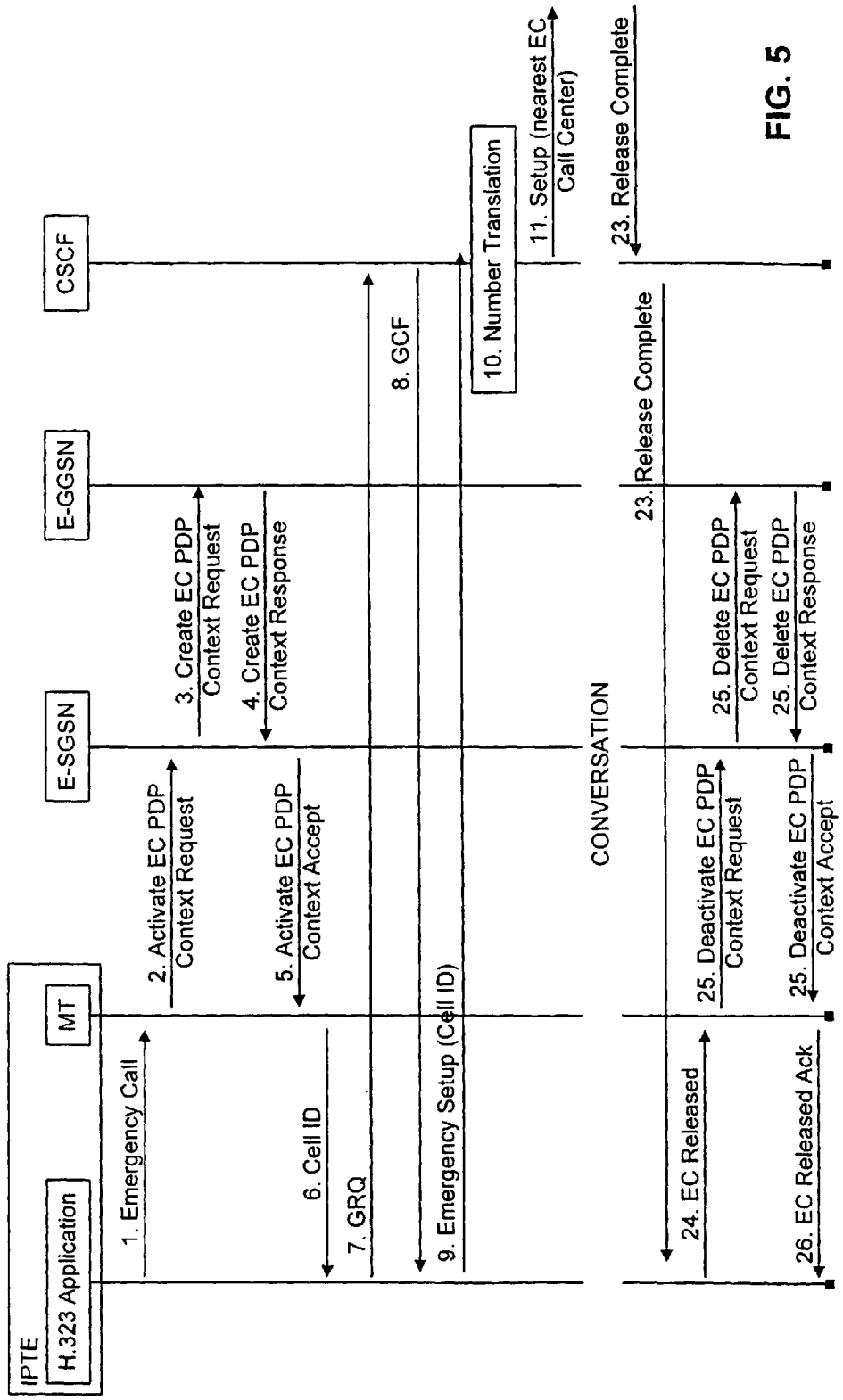
FIG. 5 shows a signaling diagram illustration a setup procedure between an IP terminal and a control unit in case of an emergency call according to a second embodiment of the present invention.

In step 10 in FIG. 5, the CSCF performs the necessary location based number translation and the new E.164 number of the nearest EC call center will be the called party number of the Setup message from the CSCF to an MGCF. Then, in a message 11, the CSCF sends the Setup message with the E.164 number of the nearest EC call center in the called party number to the MGCF.

Figure 4:
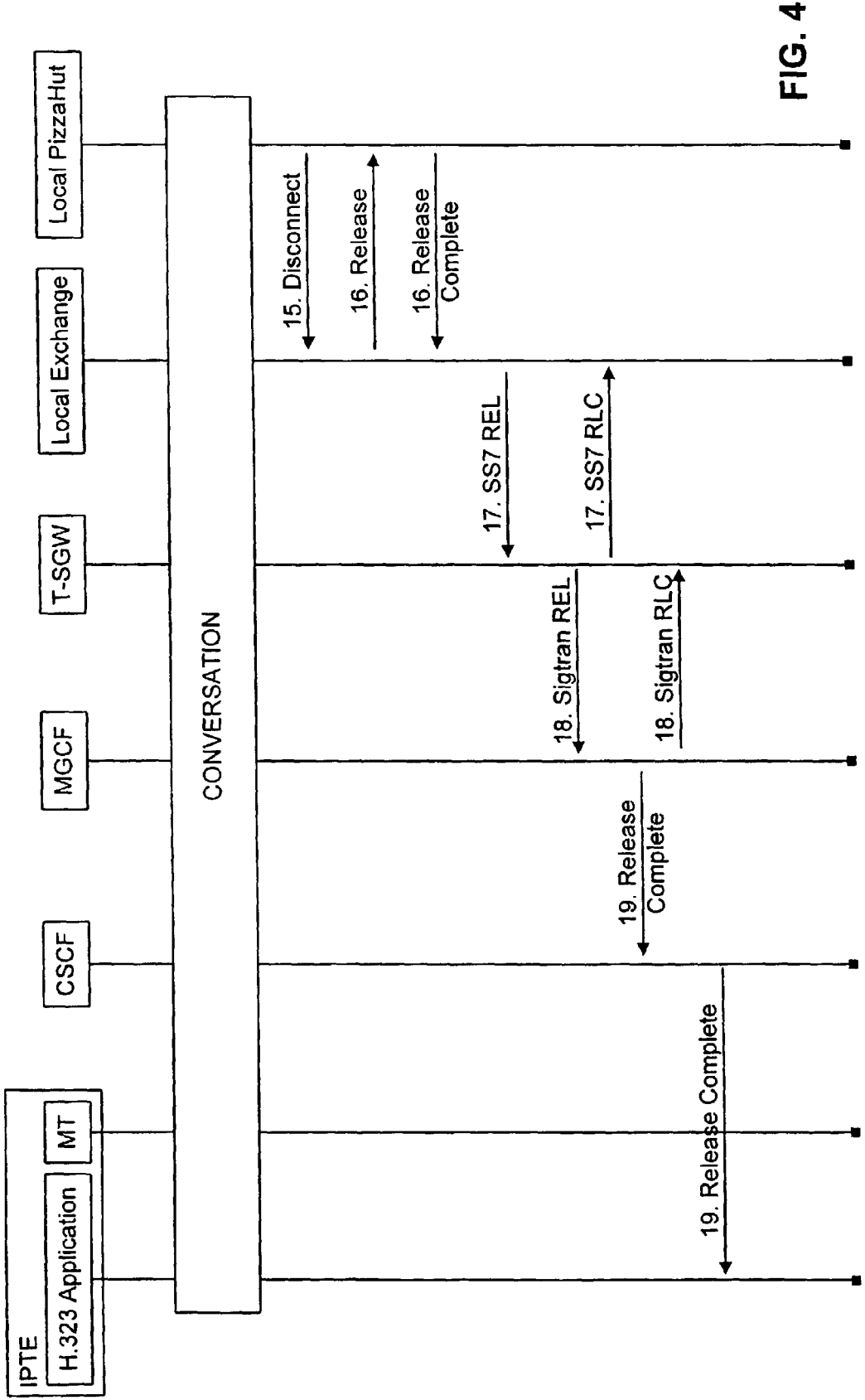
FIG. 4 shows a signaling diagram illustrating a release procedure in location dependent routing according to the first embodiment of the present invention.

The messages following the message 11, i.e. the messages 12 to 22, correspond to the messages 8 to 18 described in the first embodiment in connection with FIGS. 3 and 4, and, hence, the description thereof will be omitted.

According to a message 23 in FIG. 5, after a Disconnect message has been sent from the EC call center to the local exchange and the respective resources between the EC call center, the local exchange, the T-SGW and the MGCF have been released, the resources between the MGCF, the CSCF and the IPTE are released.

Since the IPTE had activated a high priority and guaranteed bandwidth QoS PDP context for which it does not have to pay due to the EC nature, after the call has been released, the H.323 application sends a release notification to the MT in a message 24, so that the MT can deactivate the above-mentioned PDP context. In a message 25, a normal user initiated PDP Context Deactivation procedure is performed. Finally, the MT acknowledges the EC PDP Context deactivation in a message 26.

With the present invention, the application functionality in a mobile IP telephony network can be improved.

According to the present invention, subscriber location information can be obtained on request or automatically from the mobile terminal residing in an IP terminal. The location information can be used for a location based routing to a special number or alias.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

What is claimed is:

1. A method comprising:
    checking by an IP terminal, when a call is originated from the IP terminal to another subscriber through an IP telephony mobile network, whether location information of the IP terminal is required for a call setup;
    adding, by the IP terminal, the location information of the IP terminal to call setup data of the call when the IP terminal determines that the location information of the IP terminal is required;
    determining, in the IP telephony mobile network, a destination address based on the call setup data and the location information received from the IP terminal; and
    routing the call to the determined destination address in the IP telephony mobile network.

2. The method of claim 1, wherein the IP terminal is a subscriber of the IP telephony mobile network and comprises a mobile terminal device.

3. The method according to claim 2, wherein the location information is provided by a communication between a call control application in the IP terminal and the mobile terminal device.

4. A method comprising:
    checking whether location information of an IP terminal is required for a call setup when the call to another subscriber originates from the IP terminal;
    adding the location information of the IP terminal to call setup data when required;
    mapping a special service number or alias to a destination address based on the location information of the IP terminal; and
    routing the call to the destination address;
    wherein the call is directed to the special service number requiring the location information of the IP terminal.

5. A system comprising:
    an IP terminal configured to originate a call to another subscriber through an IP telephony mobile network; and
    a control unit in the IP telephony mobile network for receiving the call which originated from the IP terminal and for routing the call to a destination address;
    wherein the IP terminal checks whether location information of the IP terminal is required for a call setup and adds the location information of the IP terminal to call setup data of the call when the IP terminal determines that the location information is required; and
    wherein the control unit determines a destination address based on the call setup data and the location information received from the IP terminal and routes the call to the determined destination address.

6. The system of claim 5, wherein the IP terminal is a subscriber of the IP telephony mobile network and comprises a mobile terminal device.

7. The system according to claim 6, wherein the location information is provided by a communication between a call control application in the IP terminal and the mobile terminal device.

8. A system comprising:
    an IP terminal adapted to originate a call to another subscriber; and
    a control unit for receiving the call which originated from the IP terminal and for routing the call to a destination address;
    wherein the IP terminal checks whether location information of the IP terminal is required for a call setup and adds the location information of the IP terminal to call setup data when required;
    wherein the control unit determines a destination address based on the call setup data and the location information of the IP terminal, routes the call to the determined destination address, and determines the destination address by mapping a special service number or alias to the destination address based on the location information of the IP terminal; and
    wherein the call originated from the IP terminal is directed to the special service number requiring the location information of the IP terminal.

9. An apparatus configured to originate a call from the apparatus to another subscriber through an IP telephony mobile network, the apparatus being configured to:
    check, when the call is originated from the apparatus to the other subscriber through the IP telephony mobile network, whether location information of the apparatus is required for a call setup; and
    add the location information of the apparatus to setup data of the call when the apparatus determines that the location information is required.

10. The apparatus of claim 9, wherein the apparatus is a subscriber of the IP telephony mobile network and comprises a mobile terminal device.

11. The apparatus of claim 10, wherein the location information of the apparatus is provided by a communication between a call control application in the apparatus and the mobile terminal device.

12. An apparatus configured to:
    receive a call originated from an IP terminal to another subscriber through an IP telephony mobile network together with location information of the IP terminal added to call setup data of the call;

determine a destination address based on the call setup data and the location information received from the IP terminal; and route the call to the determined destination address in the IP telephony mobile network.

13. The apparatus according claim 12, further configured to:

determine the destination address by mapping a special service number or alias to the destination address based on the location information.

14. The apparatus according to claim 12, further configured to:

send the call setup data with the destination address.

15. A method comprising:

originating a call from an apparatus to another subscriber through an IP telephony mobile network;

checking, when originating the call from the apparatus to the other subscriber through the IP telephony mobile network, whether location information of the apparatus is required for a call setup; and adding the location information of the apparatus to call setup data of the call when it is determined that the location information is required.

16. The method of claim 15, wherein the apparatus is a subscriber of the IP telephony mobile network and comprises a mobile terminal device.

17. The method of claim 16, further comprising:

providing the location information by a communication between a call control application in the apparatus and the mobile terminal device.

18. A method comprising:

receiving a call originated from an IP terminal to another subscriber through an IP telephony mobile network together with location information of the IP terminal added to call setup data of the call;

determining a destination address based on the call setup data and the location information received from the IP terminal; and routing the call to the determined destination address in the IP telephony mobile network.

19. The method according to claim 18, comprising:

determining the destination address by mapping a special service number or alias to the destination address based on the location information.

20. The method according to claim 18, comprising:

sending the call setup data with the destination address when determining the destination address.

* * * * *